United States Patent
Kalinowski et al.

(10) Patent No.: US 11,034,371 B2
(45) Date of Patent: Jun. 15, 2021

(54) PALLET SLED

(71) Applicant: Rehrig Pacific Company, Los Angeles, CA (US)

(72) Inventors: Dane Gin Mun Kalinowski, Foothill Ranch, CA (US); Joseph E. Popovits, II, Costa Mesa, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 16/933,681

(22) Filed: Jul. 20, 2020

(65) Prior Publication Data

US 2021/0053602 A1 Feb. 25, 2021

Related U.S. Application Data

(60) Provisional application No. 62/930,842, filed on Nov. 5, 2019, provisional application No. 62/888,682, filed on Aug. 19, 2019.

(51) Int. Cl.
*B62B 3/06* (2006.01)
*B66F 9/06* (2006.01)
*B66F 9/20* (2006.01)

(52) U.S. Cl.
CPC .............. *B62B 3/06* (2013.01); *B66F 9/06* (2013.01); *B66F 9/20* (2013.01); *B62B 3/0606* (2013.01); *B62B 3/0612* (2013.01); *B62B 3/0618* (2013.01); *B62B 2203/24* (2013.01)

(58) Field of Classification Search
CPC ..... B62B 3/06; B62B 3/0606; B62B 3/00612; B62B 2203/24; B66F 9/06; B66F 9/20

USPC ....................................................... 280/43.12
See application file for complete search history.

(56) References Cited

U.S. PATENT DOCUMENTS

| | | |
|---|---|---|
| 1,133,411 A | 3/1915 | Steele |
| 1,196,995 A | 9/1916 | Tuttle |
| 1,497,085 A | 6/1924 | Brandt |
| 2,121,764 A | 6/1938 | Quayle |
| 2,544,657 A | 3/1951 | Cushman |
| 2,860,852 A | 11/1958 | Lewis, Jr. |
| 2,916,239 A | 12/1959 | Stopps |
| 3,074,691 A | 1/1963 | Knapp et al. |
| 3,129,923 A | 4/1964 | Kikuchi |
| 3,306,579 A | 2/1967 | Campbell |

(Continued)

FOREIGN PATENT DOCUMENTS

| | | |
|---|---|---|
| DE | 2232200 A1 | 1/1973 |
| DE | 2613083 A1 | 10/1977 |

(Continued)

*Primary Examiner* — John D Walters
*Assistant Examiner* — Hilary L Johns
(74) *Attorney, Agent, or Firm* — Carlson, Gaskey & Olds, P.C.

(57) ABSTRACT

A pallet sled includes a lower frame and an upper frame. A plurality of pivot arms pivotably connect the upper frame to the lower frame. The upper frame is movable between a lowered position and raised position. The upper frame is spaced further from the lower frame in the raised position than in the lowered position. The upper frame is rotated slightly relative to the lower frame when moved from the lowered position to the raised position. In the example embodiment, the upper frame is rotated approximately 1.5 degrees to approximately 2.0 degrees toward the upright handle of the pallet sled.

26 Claims, 17 Drawing Sheets

(56) References Cited

U.S. PATENT DOCUMENTS

| | | |
|---|---|---|
| 3,424,110 A | 1/1969 | Toot |
| 3,526,195 A | 9/1970 | Marynovich |
| 3,640,229 A | 2/1972 | Bell |
| 3,685,461 A | 8/1972 | Belcher |
| 3,685,463 A | 8/1972 | Francis |
| D225,397 S | 12/1972 | Lindley et al. |
| 3,709,162 A | 1/1973 | Roper |
| 4,013,021 A | 3/1977 | Steinlein et al. |
| 4,133,270 A | 1/1979 | Ravera |
| D258,948 S | 4/1981 | Stump, Jr. |
| 4,263,855 A | 4/1981 | Lawlor |
| 4,428,306 A | 1/1984 | Dresen et al. |
| 4,879,956 A | 11/1989 | Shuert |
| 5,046,434 A | 9/1991 | Breezer et al. |
| 5,088,418 A | 2/1992 | Reckermann et al. |
| 5,117,762 A | 6/1992 | Shuert |
| 5,168,817 A | 12/1992 | Nulle et al. |
| 5,341,748 A | 8/1994 | Liu |
| 5,405,236 A | 4/1995 | Sundstrom et al. |
| 5,527,585 A | 8/1996 | Needham et al. |
| 5,566,624 A | 10/1996 | Brown et al. |
| 5,606,921 A | 3/1997 | Elder et al. |
| 5,638,760 A | 6/1997 | Jordan et al. |
| 5,664,934 A | 9/1997 | Schaede et al. |
| D388,931 S | 1/1998 | Constantino et al. |
| 5,755,162 A | 5/1998 | Knight et al. |
| 5,769,001 A | 6/1998 | Viessmann |
| 5,769,003 A | 6/1998 | Rose et al. |
| 5,791,262 A | 8/1998 | Knight et al. |
| 5,813,355 A | 9/1998 | Brown et al. |
| D400,681 S | 11/1998 | Sadr |
| 5,857,416 A | 1/1999 | Donnell, Jr. et al. |
| 5,950,545 A | 9/1999 | Shuert |
| 5,964,162 A | 10/1999 | Chuan-Jen |
| 5,996,508 A | 12/1999 | Constantino et al. |
| 6,186,728 B1 * | 2/2001 | Michaud ............... B62B 3/0631 254/10 R |
| 6,289,823 B1 | 9/2001 | Koefelda et al. |
| 6,294,114 B1 | 9/2001 | Muirhead |
| 6,327,984 B1 | 12/2001 | McCann et al. |
| 6,718,888 B2 | 4/2004 | Muirhead |
| D513,104 S | 12/2005 | Harding et al. |
| 6,997,113 B1 | 2/2006 | Harding et al. |
| 7,114,906 B1 | 10/2006 | Baumgarner et al. |
| D548,924 S | 8/2007 | Frankenberg |
| 7,293,509 B2 | 11/2007 | Hassell |
| 7,360,493 B2 | 4/2008 | Hummel et al. |
| 7,641,011 B2 | 1/2010 | Fridlington, Jr. et al. |
| 7,690,315 B2 | 4/2010 | Apps |
| 7,735,429 B2 | 6/2010 | Meissen |
| 7,819,068 B2 | 10/2010 | Apps et al. |
| 7,856,932 B2 | 12/2010 | Stahl et al. |
| 7,987,797 B2 | 8/2011 | Stahl et al. |
| 7,988,405 B2 | 8/2011 | Ellington |
| 8,011,677 B1 | 9/2011 | Ellington et al. |
| 8,075,244 B2 | 12/2011 | Ellington |
| 8,191,486 B2 | 6/2012 | Apps et al. |
| 8,196,527 B2 | 6/2012 | Linares |
| 8,230,793 B2 | 7/2012 | Apps |
| 8,282,111 B2 | 10/2012 | Hailston et al. |
| 8,291,839 B2 | 10/2012 | Apps et al. |
| 8,360,443 B2 | 1/2013 | Ellington |
| 8,376,089 B2 * | 2/2013 | Stone ..................... B66F 9/06 187/232 |
| 8,448,583 B2 | 5/2013 | Apps et al. |
| 8,776,697 B1 | 7/2014 | O'Connell |
| 8,894,076 B2 | 11/2014 | Hailston et al. |
| 8,950,759 B2 | 2/2015 | Thorsen et al. |
| D724,809 S | 3/2015 | Howland et al. |
| 8,967,056 B2 | 3/2015 | Apps et al. |
| D729,488 S | 5/2015 | Pulskamp et al. |
| 9,027,487 B1 | 5/2015 | O'Connell |
| 9,169,040 B2 | 10/2015 | Evans et al. |
| 9,260,125 B2 | 2/2016 | Ellington et al. |
| D753,392 S | 4/2016 | Haas et al. |
| D756,645 S | 5/2016 | Haas et al. |
| 9,387,953 B2 | 7/2016 | Takyar et al. |
| 9,403,547 B2 | 8/2016 | Ellington |
| 9,611,071 B2 | 4/2017 | Baltz et al. |
| 10,464,586 B2 | 11/2019 | Kalinowski et al. |
| 10,479,661 B2 | 11/2019 | King et al. |
| 2001/0029874 A1 | 10/2001 | Muirhead |
| 2002/0017225 A1 | 2/2002 | Koefelda et al. |
| 2004/0134390 A1 | 7/2004 | Apps et al. |
| 2004/0168618 A1 | 9/2004 | Muirhead |
| 2005/0211139 A1 | 9/2005 | Perrotta et al. |
| 2006/0032411 A1 | 2/2006 | Hummel et al. |
| 2006/0162624 A1 | 7/2006 | Hassell |
| 2006/0254476 A1 | 11/2006 | MacDonald et al. |
| 2007/0210542 A1 | 9/2007 | Hammond |
| 2007/0272640 A1 | 11/2007 | Garcia |
| 2008/0060561 A1 | 3/2008 | Carrasco |
| 2008/0295748 A1 | 12/2008 | Yoshida et al. |
| 2009/0050030 A1 | 2/2009 | Apps et al. |
| 2009/0183953 A1 | 7/2009 | Ellington |
| 2009/0185890 A1 | 7/2009 | Ellington |
| 2010/0043678 A1 | 2/2010 | Linares |
| 2010/0095875 A1 | 4/2010 | Hailston et al. |
| 2010/0196134 A1 | 8/2010 | Stahl et al. |
| 2010/0295261 A1 | 11/2010 | Ellington |
| 2011/0100268 A1 | 5/2011 | Milkowski et al. |
| 2011/0139040 A1 | 7/2011 | Apps et al. |
| 2011/0171000 A1 | 7/2011 | Hailston |
| 2012/0291678 A1 | 11/2012 | Howland et al. |
| 2012/0319063 A1 | 12/2012 | Hailston et al. |
| 2013/0202400 A1 | 8/2013 | Richard et al. |
| 2013/0223962 A1 | 8/2013 | Ellington et al. |
| 2014/0000493 A1 | 1/2014 | Apps et al. |
| 2014/0283713 A1 | 9/2014 | Baltz et al. |
| 2015/0108037 A1 | 4/2015 | Evans et al. |
| 2015/0135999 A1 | 5/2015 | Takyar et al. |
| 2015/0225215 A1 | 8/2015 | King et al. |
| 2016/0318656 A1 | 11/2016 | Takyar et al. |
| 2016/0318657 A1 | 11/2016 | Takyar et al. |
| 2017/0240194 A1 | 8/2017 | Kalinowski et al. |
| 2017/0297881 A1 | 10/2017 | King et al. |
| 2017/0341667 A1 * | 11/2017 | Kalinowski ............ B62B 3/001 |
| 2018/0029623 A1 | 2/2018 | Kalinowski et al. |
| 2018/0057032 A1 | 3/2018 | Brewer et al. |
| 2018/0162434 A1 | 6/2018 | Kalinowski et al. |
| 2020/0216300 A1 * | 7/2020 | Finstad ................ B62B 3/0643 |

FOREIGN PATENT DOCUMENTS

| | | |
|---|---|---|
| DE | 2733457 A1 | 2/1979 |
| DE | 3806097 C1 | 9/1989 |
| DE | 29619299 U1 | 1/1997 |
| EP | 0202203 A2 | 11/1986 |
| EP | 0849184 A1 | 6/1998 |
| EP | 2028117 A1 | 2/2009 |
| EP | 2724956 A1 | 4/2014 |
| FR | 1449377 A | 8/1966 |
| FR | 2206248 A1 | 6/1974 |
| FR | 2259023 A1 | 8/1975 |
| FR | 2274512 A1 | 1/1976 |
| FR | 2486029 A1 | 1/1982 |
| GB | 859186 A | 1/1961 |
| GB | 901340 A | 7/1962 |
| HU | 210624 B | 6/1995 |
| HU | 9900326 A2 | 5/1999 |
| JP | 53058581 | 5/1978 |
| JP | 04114859 | 4/1992 |
| JP | 06179448 | 6/1994 |
| JP | 06191536 | 7/1994 |
| JP | 2006298230 A | 11/2006 |
| WO | 9411262 A1 | 5/1994 |
| WO | 2004063035 A1 | 7/2004 |
| WO | 2005068309 A1 | 7/2005 |
| WO | 2014067077 A1 | 5/2014 |

* cited by examiner

PALLET SLED

BACKGROUND

Pallet sleds are used as to deliver pallets of goods, such as beverages, from a trailer into a store. During the delivery process, the operator will use the sled to pick a pallet from the trailer, transport it through the parking lot/street/block/ etc. and into the store. Common store types for this style of delivery are convenience stores. During transportation, the driver may encounter obstacles such as ramps (ADA, sidewalk, etc.), potholes, ground undulations, door thresholds, curb or sidewalk thresholds that may require adequate maneuverability, additional control of the load (stability) on the sled and additional ground clearance. Standard and currently available equipment may not have the required maneuverability, control or ground clearance required.

SUMMARY

A pallet sled includes a lower frame and an upper frame. A plurality of pivot arms pivotably connect the upper frame to the lower frame. The upper frame is movable between a lowered position and raised position. The upper frame is spaced further from the lower frame in the raised position than in the lowered position. The upper frame is rotated slightly relative to the lower frame when moved from the lowered position to the raised position.

In the example embodiment, the upper frame is rotated approximately 1.5 degrees to approximately 2.0 degrees toward the upright handle of the pallet sled. This provides additional clearance for the front of the pallet, by lifting those feet further off the ground. This also increases the stability of the load by shifting the center of mass toward the backrest of the handle. The length of the upper frame (and the whole pallet sled) may be reduced, which makes the pallet sled more maneuverable and lighter.

The upper frame may be connected to the lower frame by a plurality of pivot arms. The relative lengths, positions, and axes of the pivot arms cause the upper frame to rotate slightly relative to the lower frame (and the floor) when moved to the raised position.

DETAILED DESCRIPTION

Figure 1:
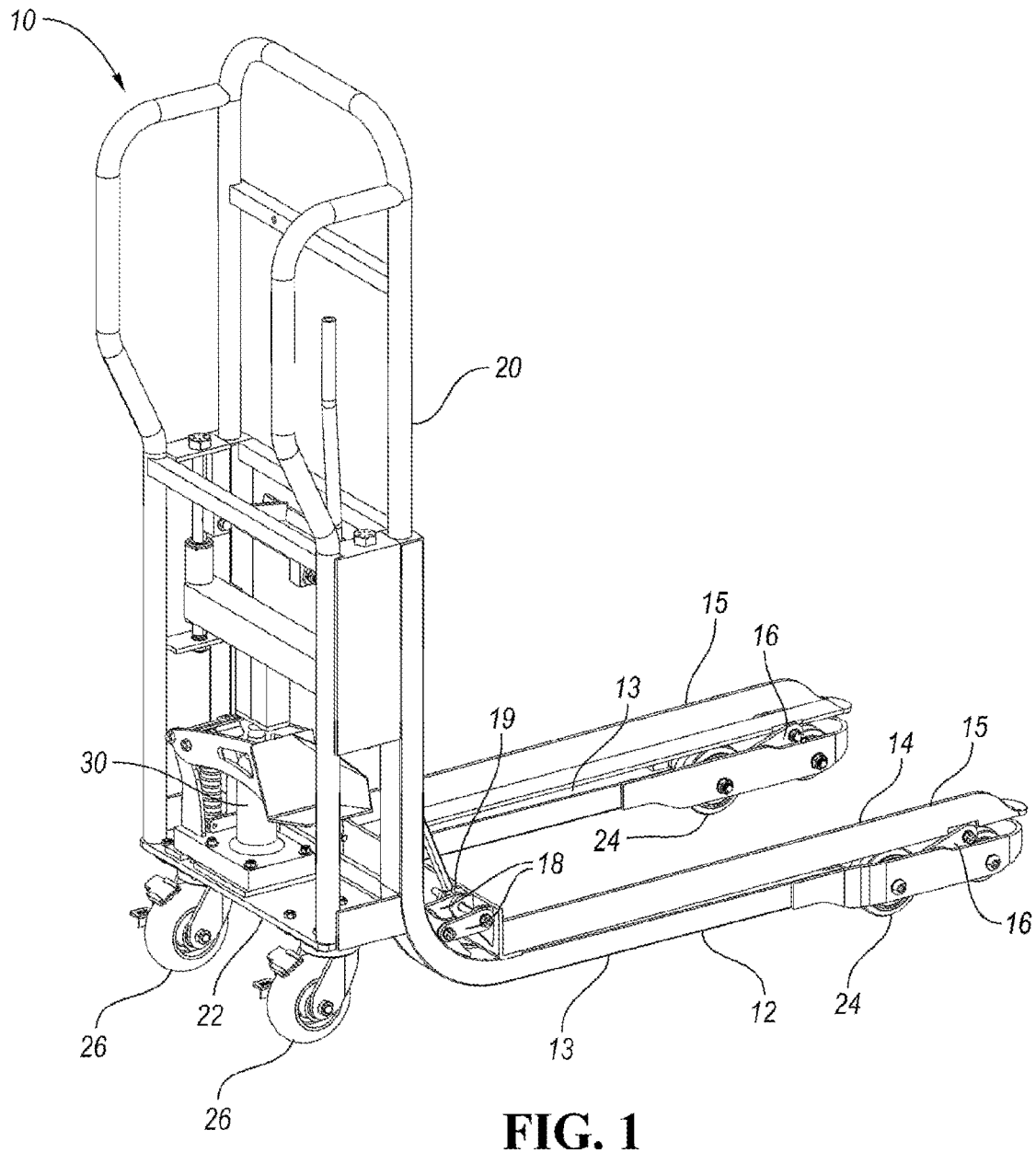
FIG. 1 is a rear perspective view of the pallet sled.
Figure 2:
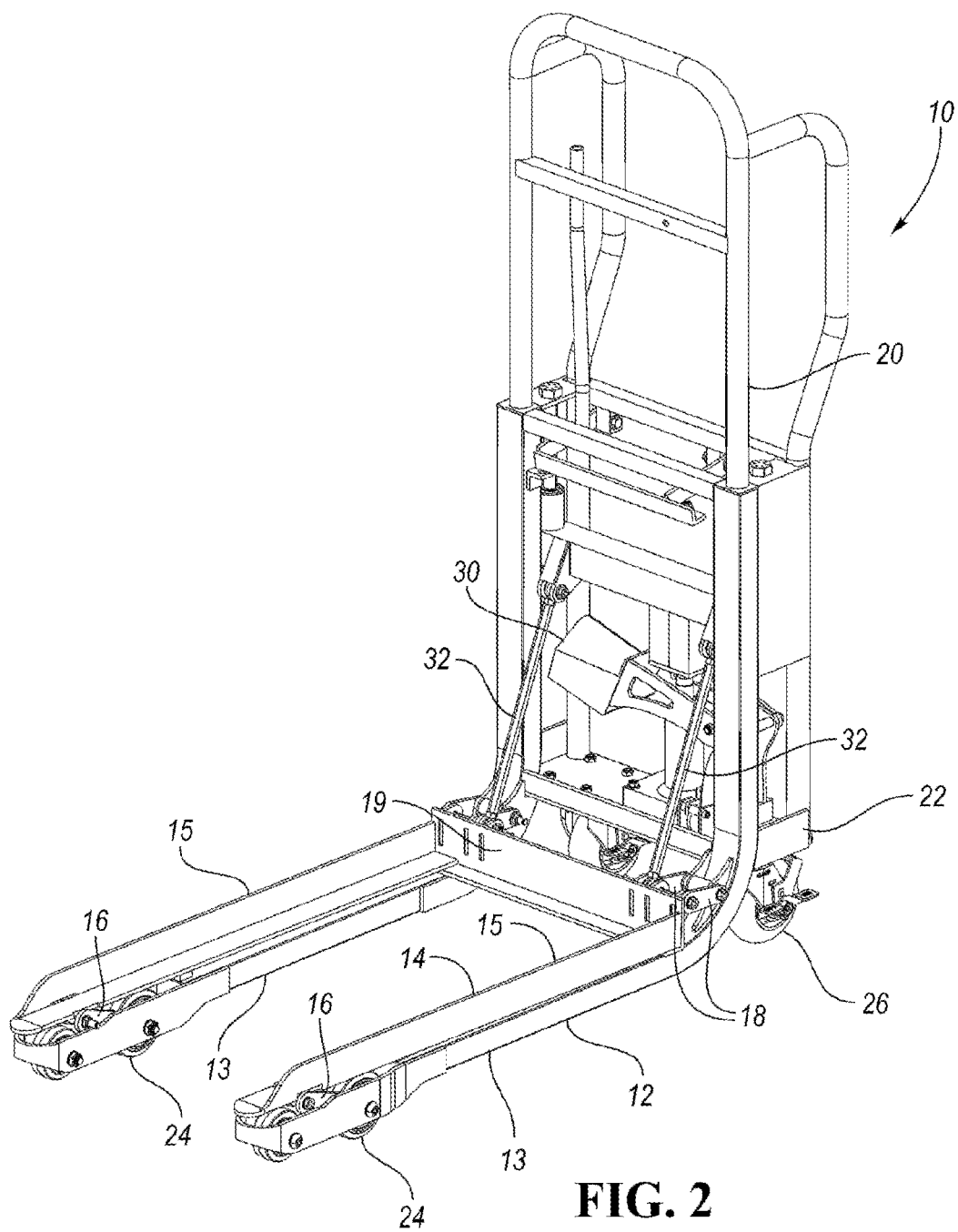
FIG. 2 is a front perspective view of the pallet sled of FIG. 1.

A pallet sled 10 according to one example is shown in FIG. 1. The pallet sled 10 is used for lifting and moving pallets, particularly half-pallets, between a delivery trailer or truck and a store. FIG. 1 is a rear perspective view of the pallet sled 10. FIG. 2 is a front perspective view of the pallet sled 10 of FIG. 1.

Referring to FIGS. 1 and 2, the pallet sled 10 includes a lower frame 12 and an upper frame 14 connected by outer pivot arms 16 at an outer end and inner pivot arms 18 at an inner end. The lower frame 12 includes a pair of spaced-apart lower arms 13. The upper frame 14 includes a pair of spaced-apart upper arms 15. In this embodiment, there are two outer pivot arms 16 and two inner pivot arms 18 connecting each upper arm 15 to each lower arm 13 but one or more could also be used.

The lower frame 12 and upper frame 14 are symmetric and the right side is the mirror image of the left side 10. A U-shaped cradle 19 is mounted at the inner end of the upper frame 14 and opens outwardly. The lower frame 12 curves upward at the inner end and extends to a vertical handle portion 20. A base 22 extends inwardly from a lower end of the vertical handle portion 20. A pair of outer wheels 24 support the lower frame 12 at an outer end. A pair of inner wheels 26 are connected to the base 22. A lift mechanism 30, such as a hydraulic lift mechanism 30, is supported on the base 22. Alternatively, the lift mechanism 30 can be electric, manual, electrohydraulic etc.

The lift mechanism 30 is coupled to the upper frame 14 via linkage 32. More specifically, the lift mechanism 30 is coupled to the cradle 19 (or other cross-bar) via linkage 32. The cradle 19 couples the two sides of the pallet sled 10 to one another. The pallet sled 10 includes a pair of spaced-apart arms (each having part of the lower frame 12 and part of the lower frame 12) between which the feet of the pallet can be received.

Figure 3:
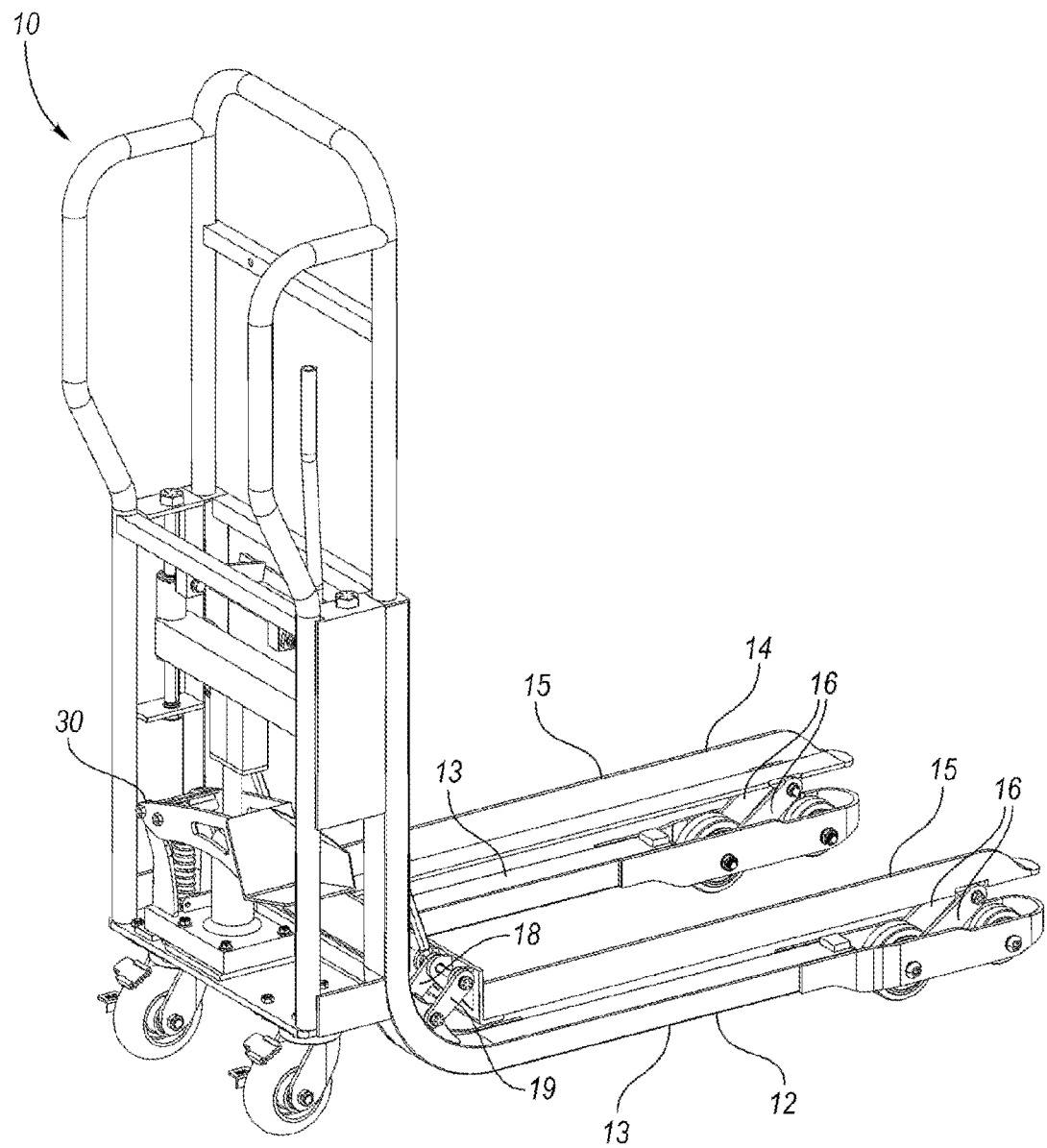
FIG. 3 is a rear perspective view of the pallet sled in an interim position of raising the upper frame relative to the lower frame.
Figure 4:
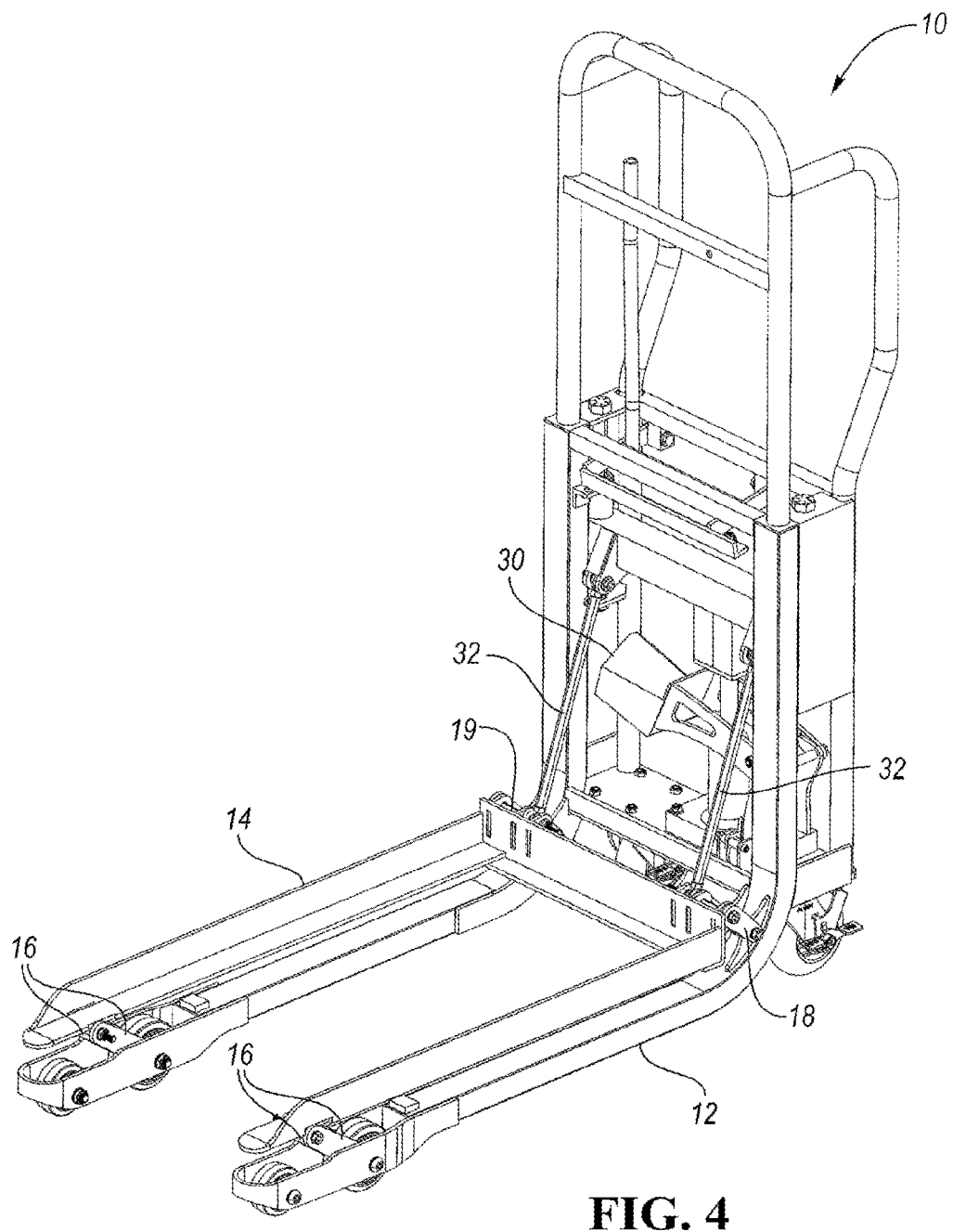
FIG. 4 is a front perspective view of the pallet sled of FIG. 3.

FIGS. 3 and 4 show the pallet sled 10 in an interim position of raising the upper frame 14 relative to the lower frame 12. For example, the user may activate the lift mechanism 30 by pumping the hydraulic mechanism foot pedal, causing the lift mechanism to lift upward on the cradle 19. This causes the upper frame 14 to lift upward relative to the lower frame 12.

Figure 5:
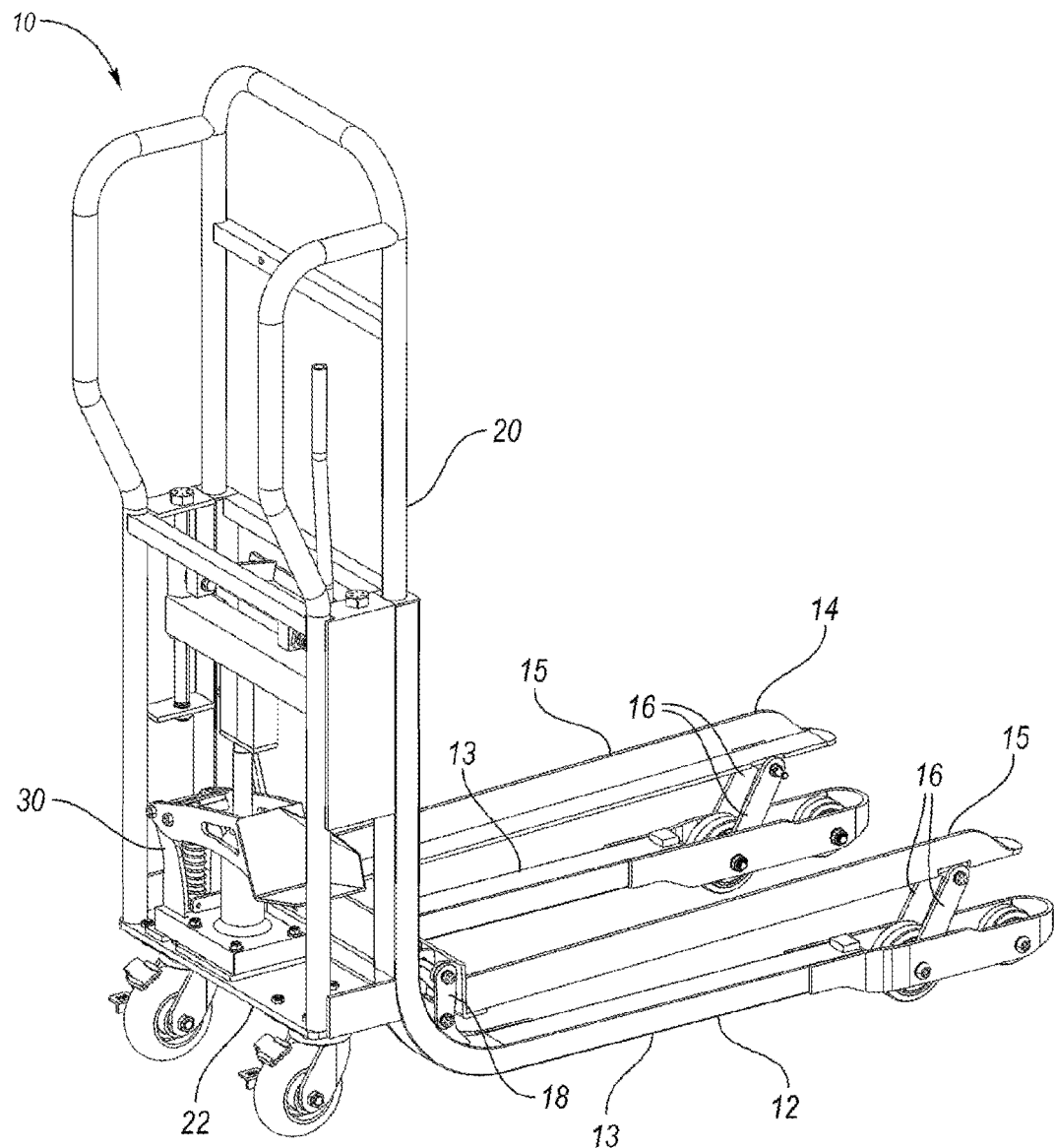
FIG. 5 is a rear perspective view of the pallet sled in a fully raised position.
Figure 6:
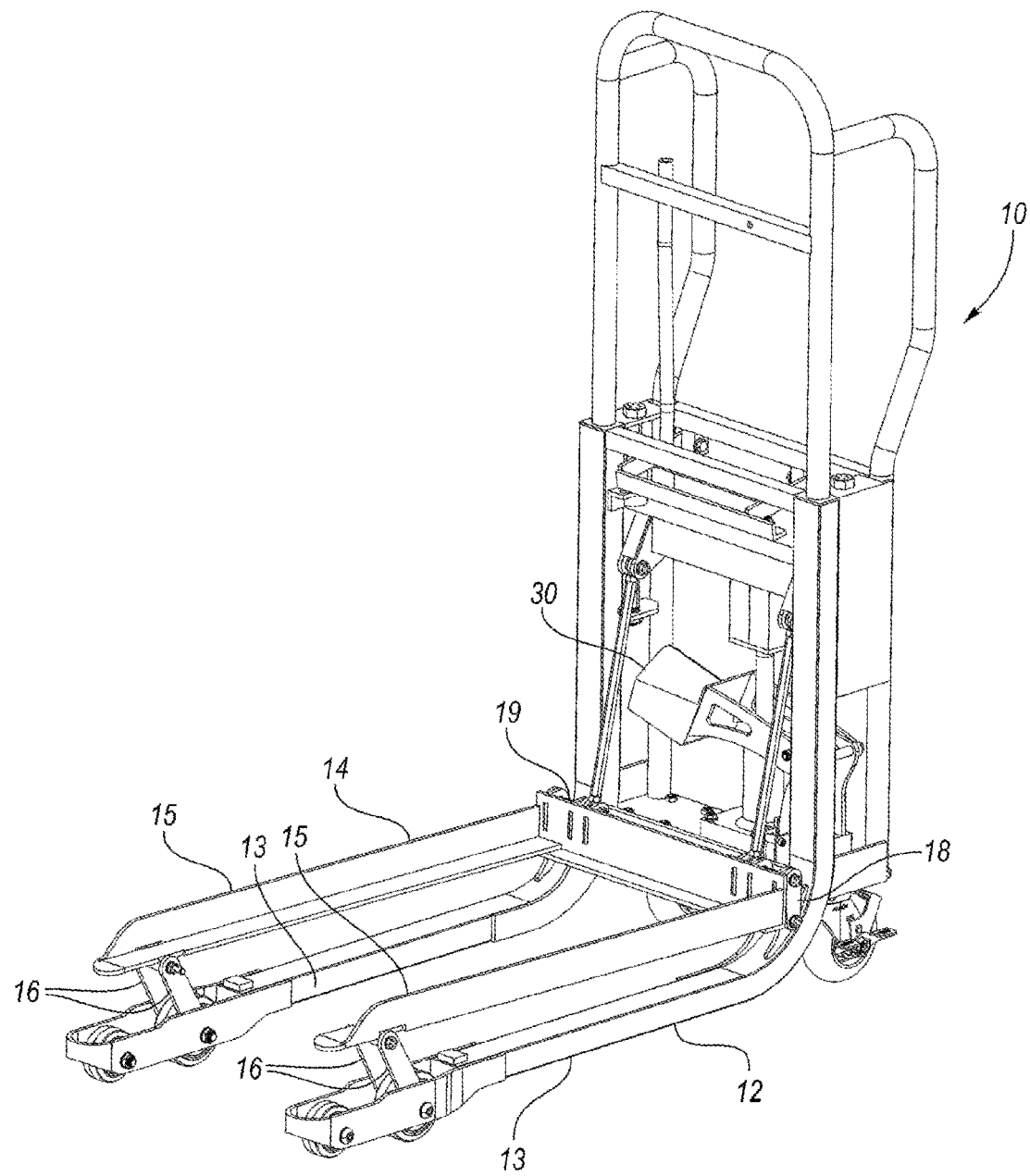
FIG. 6 is a front perspective view of the pallet sled of FIG. 5.

FIGS. 5 and 6 show the pallet sled 10 in a fully raised position, i.e. the upper frame 14 is the maximum distance from the lower frame 12. As the lift mechanism 30 continues to lift the upper frame 14, the upper frame 14 pivots upward (and somewhat inward/rearward) on the inner pivot arms 18 and outer pivot arms 16. In the fully raised position, the inner pivot arms 18 are substantially vertical and the outer pivot arms 16 are within 10 or 15 degrees of vertical. As shown, in this position, the outer ends of the upper frame 14 are higher above the floor than are the inner ends of the upper frame 14 and the cradle 19. This is implemented by the length of the outer pivot arms 16, the length of the inner pivot arms 18 and their respective pivot axes, which are all selected to cause the upper frame 14 to tilt toward the inner end slightly (e.g. approximately 1.5 to approximately 2.0 degrees).

Figure 7:
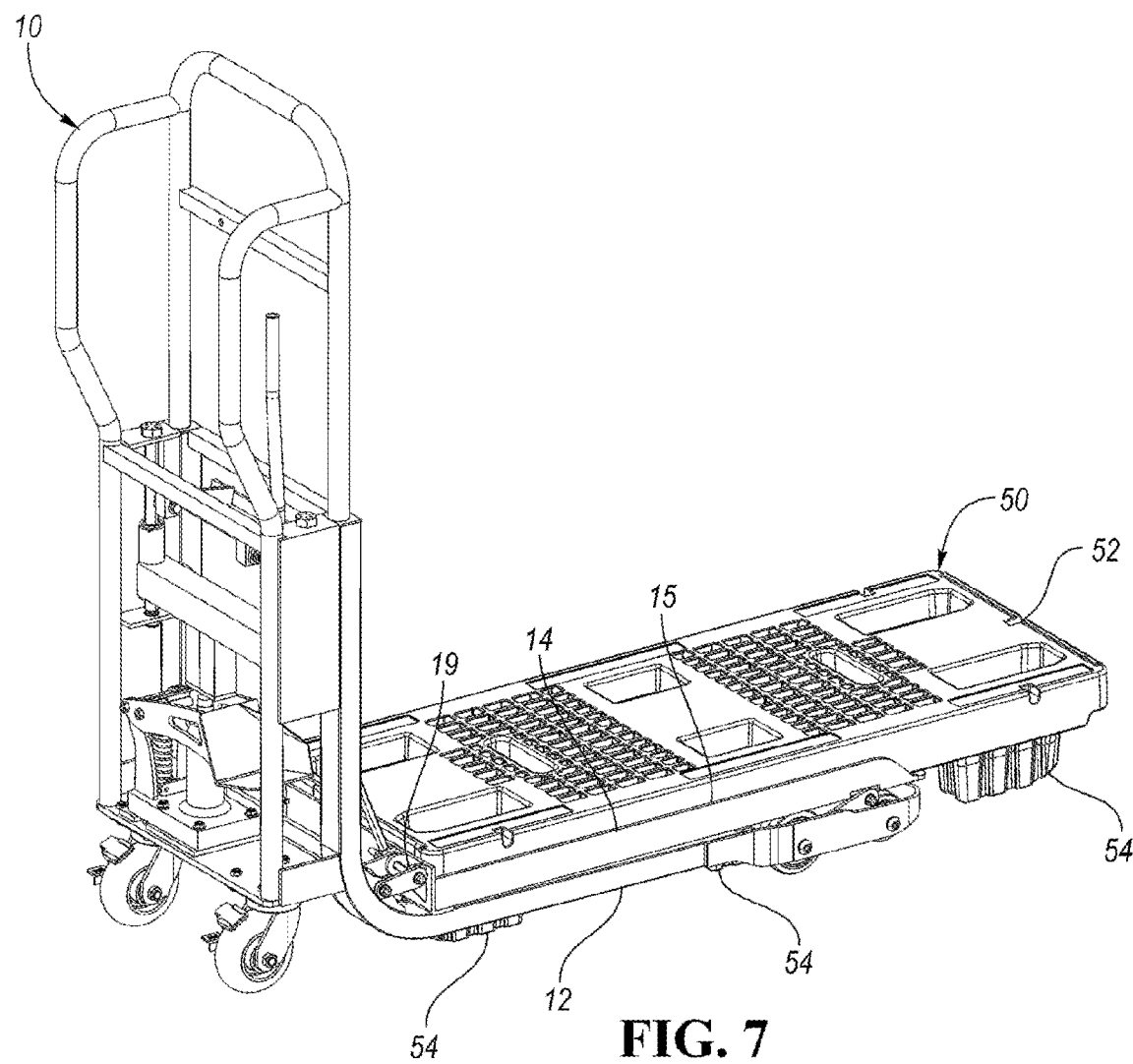
FIGS. 7-9 show the pallet sled with the upper frame in the low position.
Figure 8:
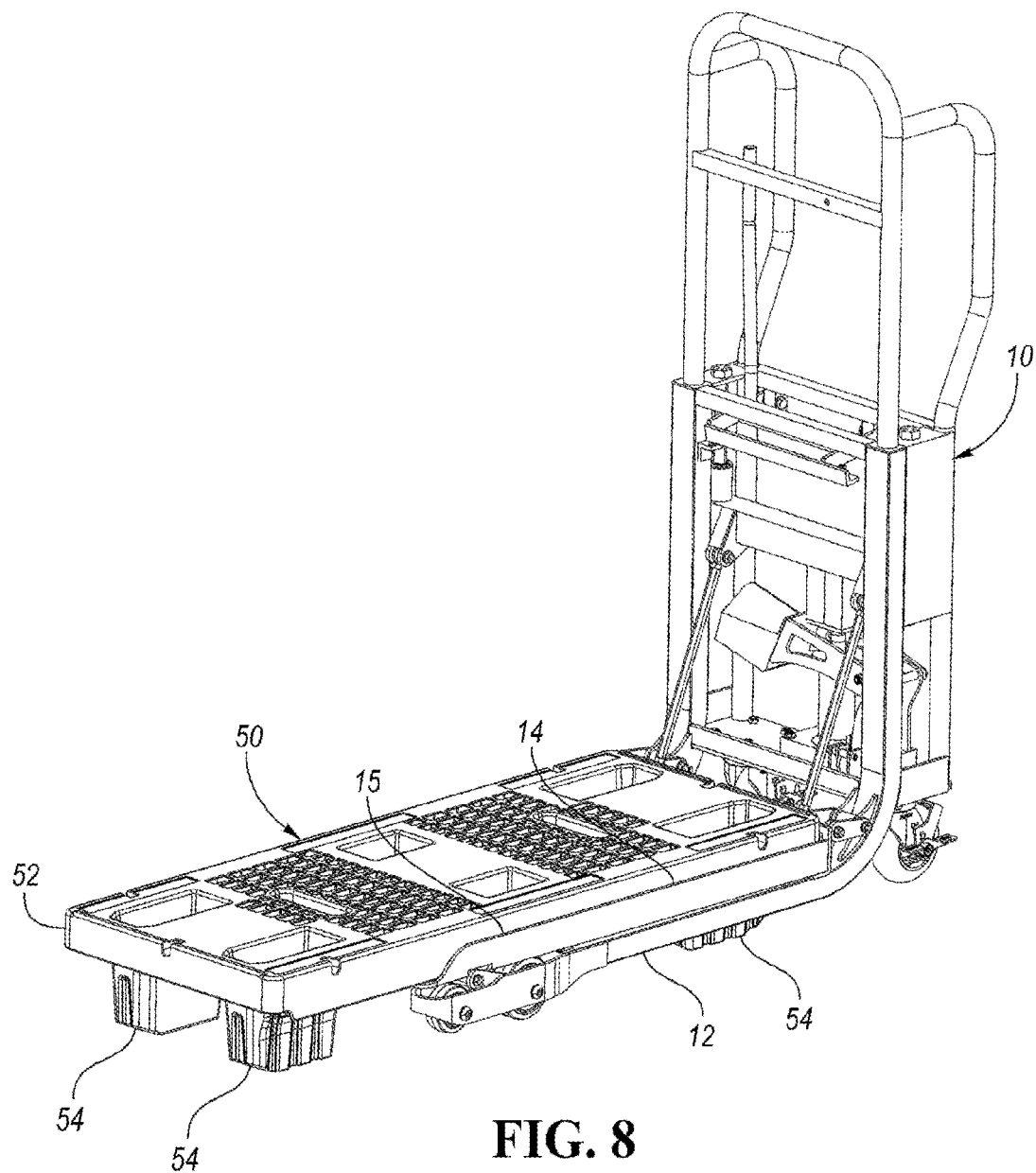
Figure 9:
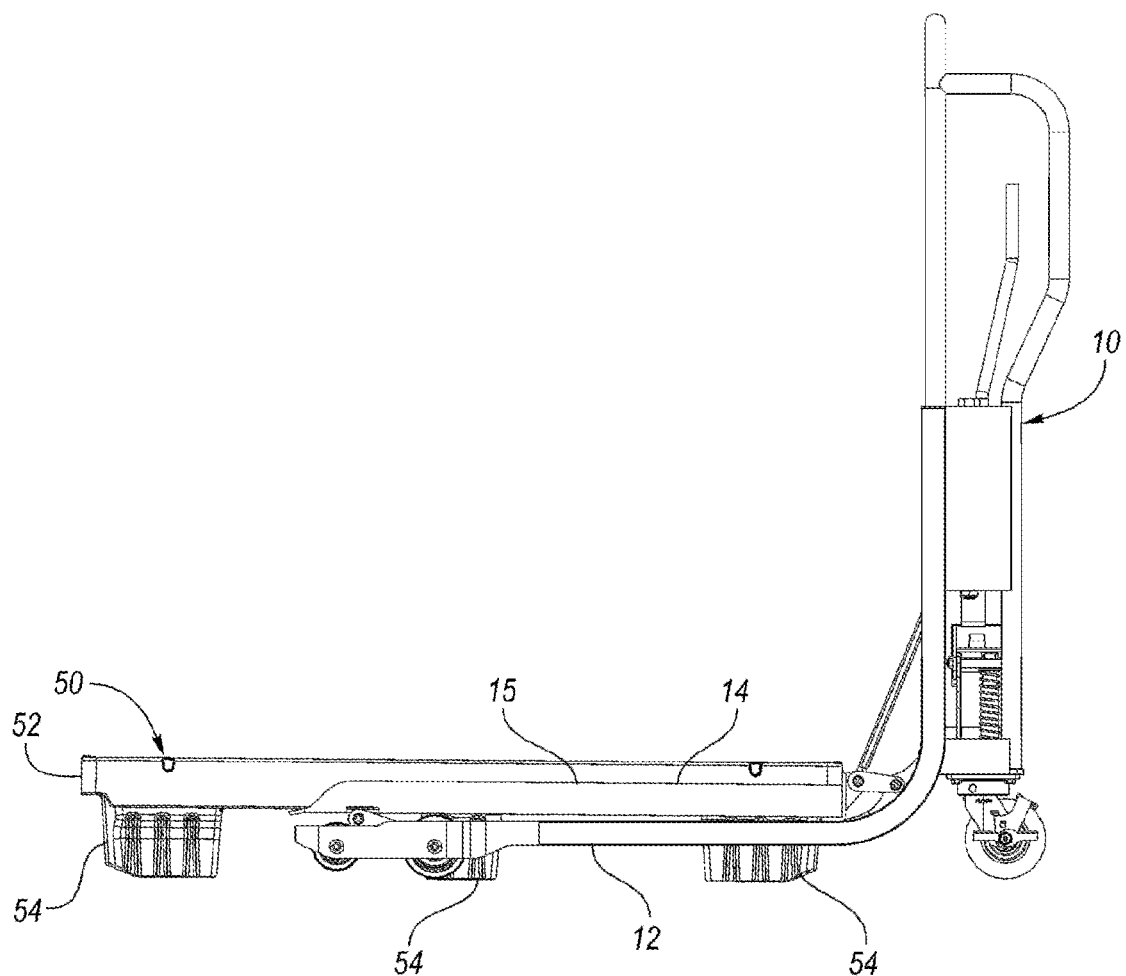

FIGS. 7-9 show the pallet sled 10 with the upper frame 14 in the low position. The pallet sled 10 is then rolled under a pallet 50. The pallet 50 includes a deck 52 for supporting goods (such as cases or crates of beverage containers)

thereon and a plurality of feet 54 supporting the deck 52 above the floor. The feet 54 are spaced inward from the outer periphery of the deck 52. The upper arms 15 are received under the deck 52 outward of the feet 54. The cradle 19 also is received under the deck 52. The feet 54 of the pallet 50 are received between the upper arms 15 and between the lower arms 13. In this position, the upper frame 14 and upper arms 15 are substantially parallel to the floor and to the lower frame 12 and to the lower arms 13.

Figure 10:
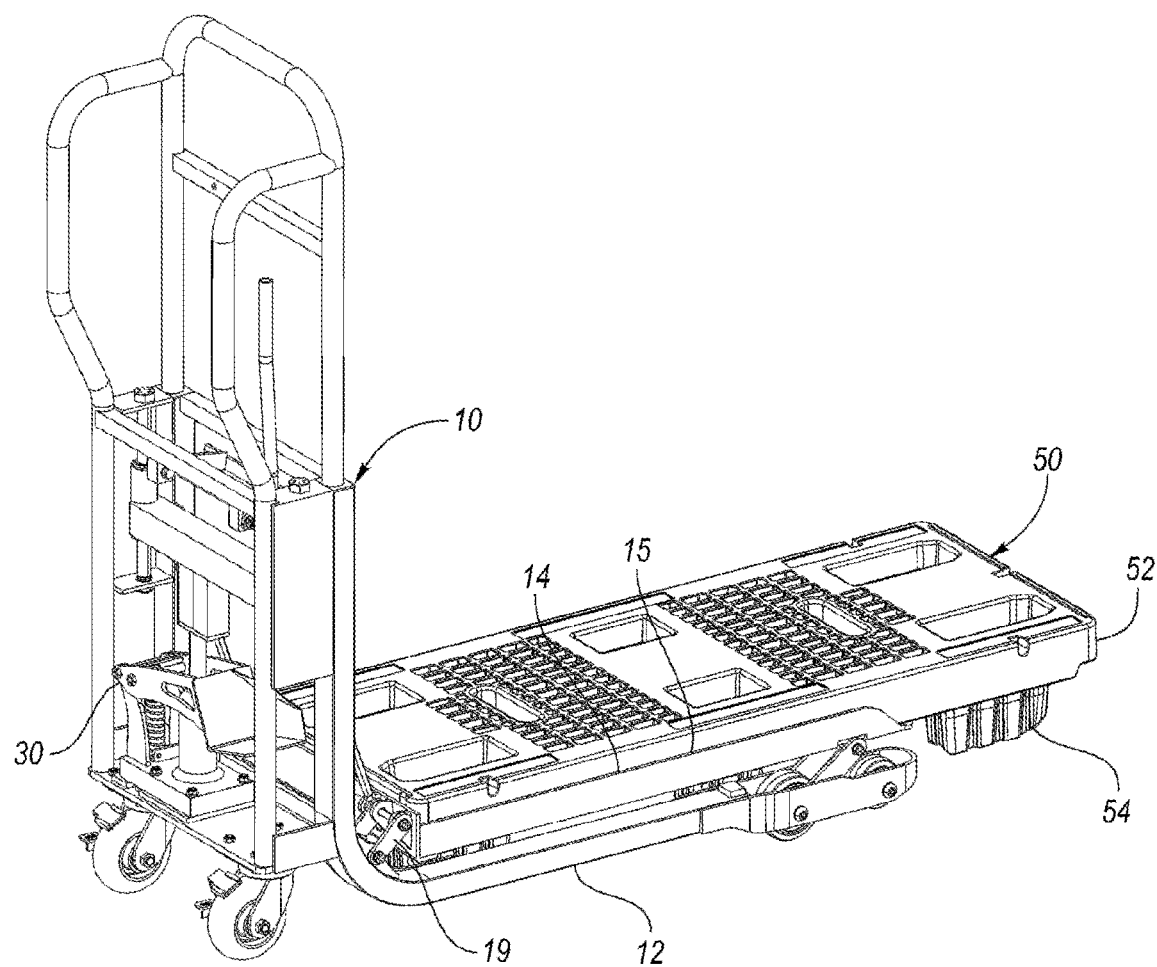
FIGS. 10-12 show the pallet sled in the process of lifting the pallet through an interim position.
Figure 11:
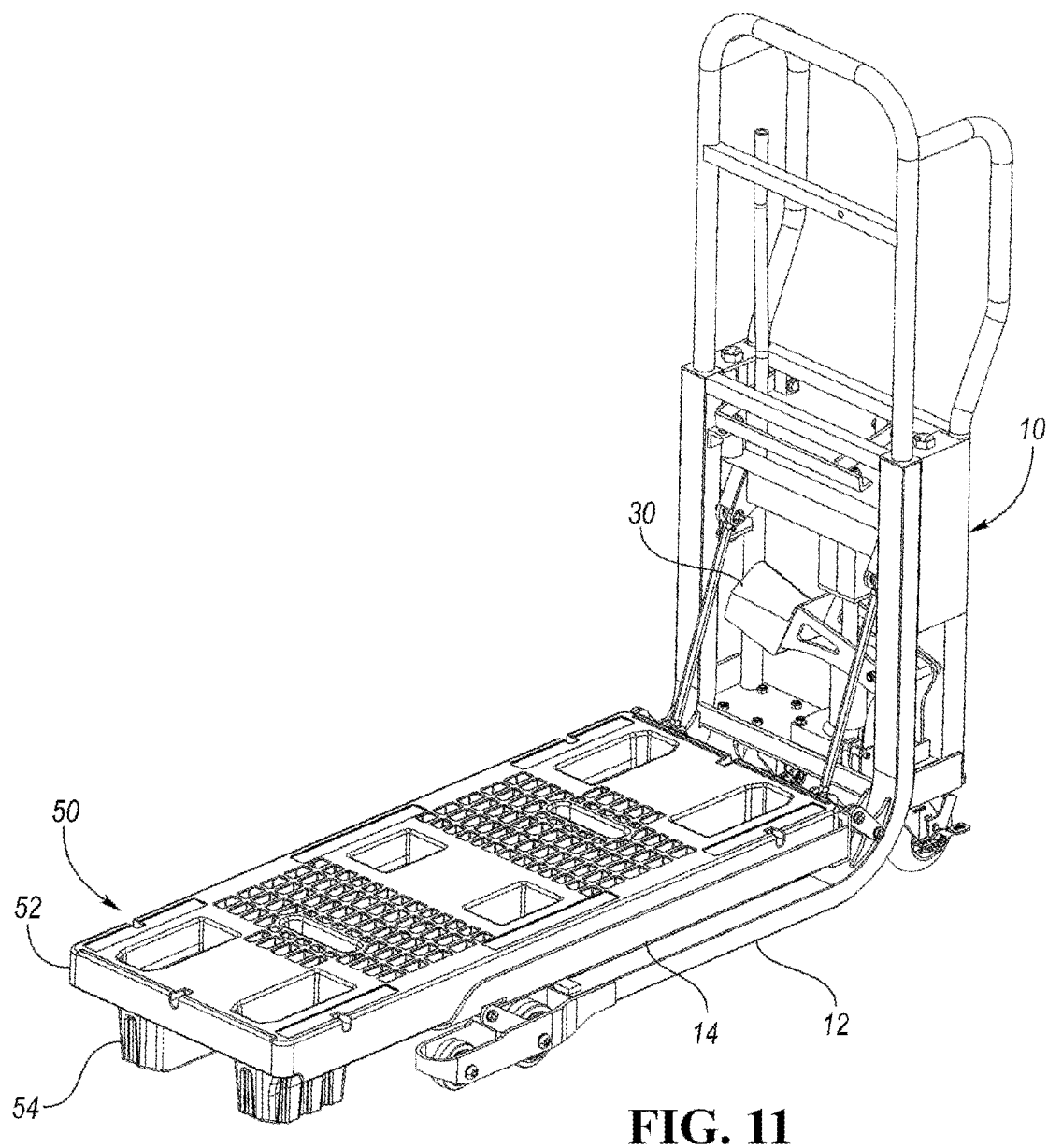
Figure 12:
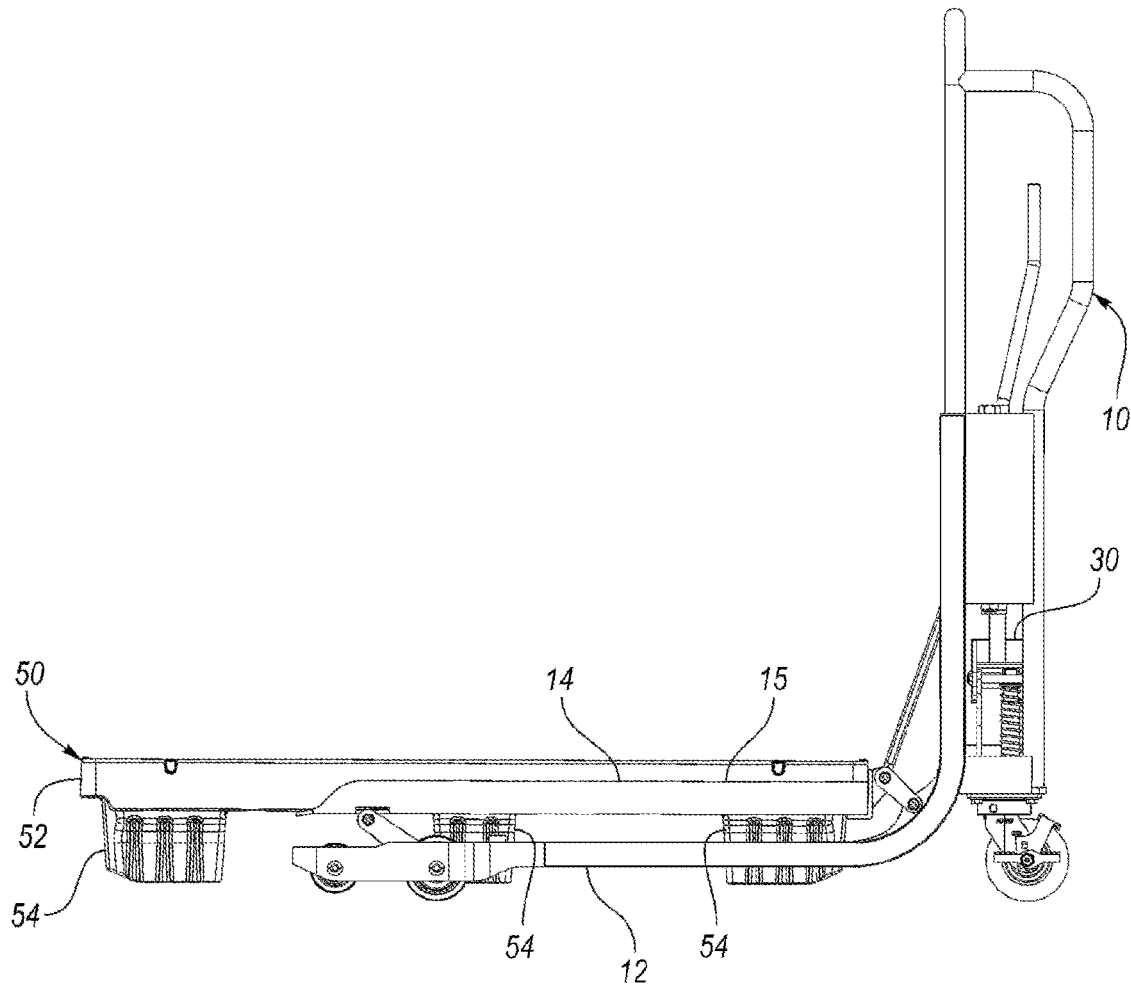

FIGS. 10-12 show the pallet sled 10 in the process of lifting the pallet 50 through an interim position, based upon actuation of the lift mechanism 30. In this mid-position, the feet 54 are lifted from the floor. The upper frame 14 and cradle 19 lift the pallet 50 by the deck 52.

Figure 13:
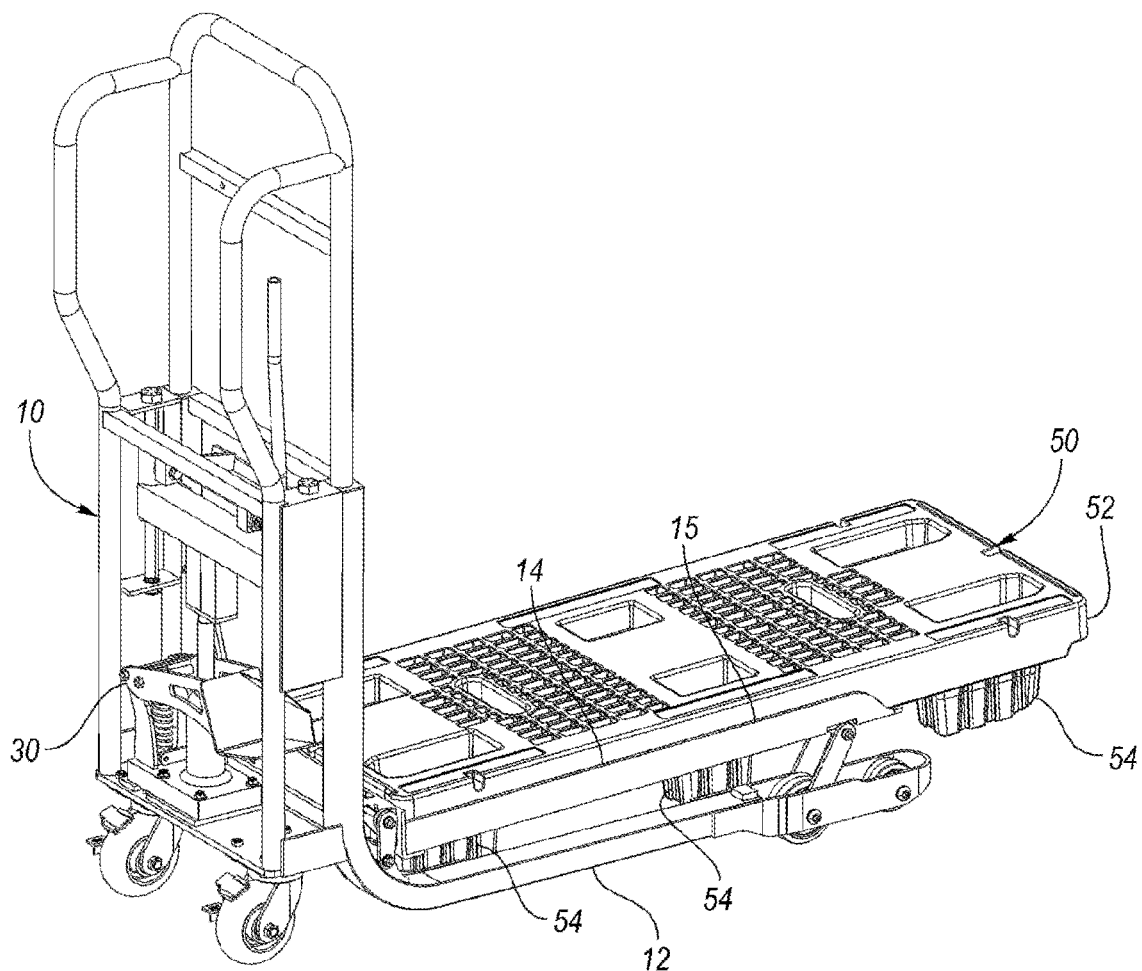
FIGS. 13-15 show the pallet sled with the upper frame lifted to its uppermost, lifted position.
Figure 14:
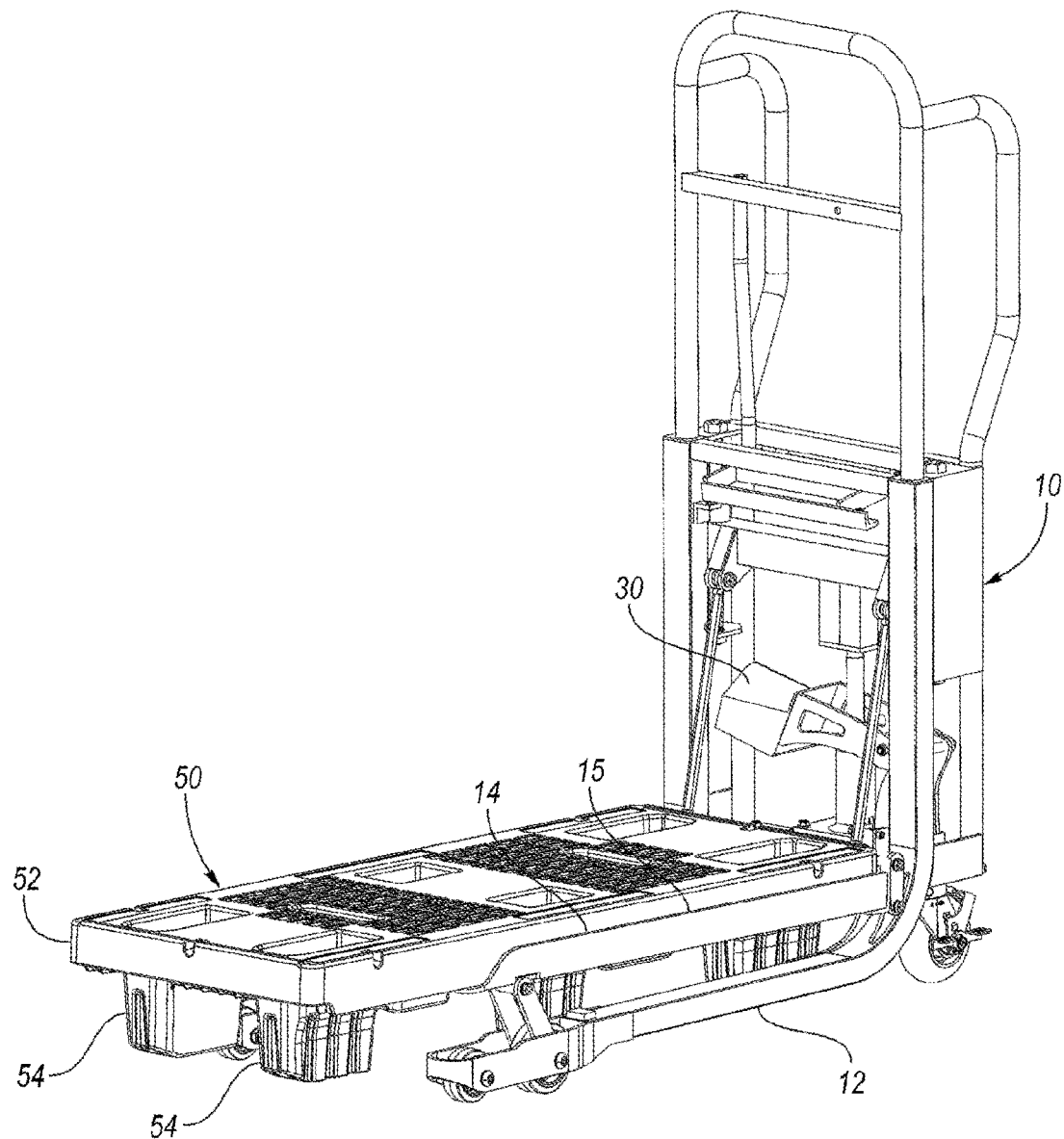
Figure 15:
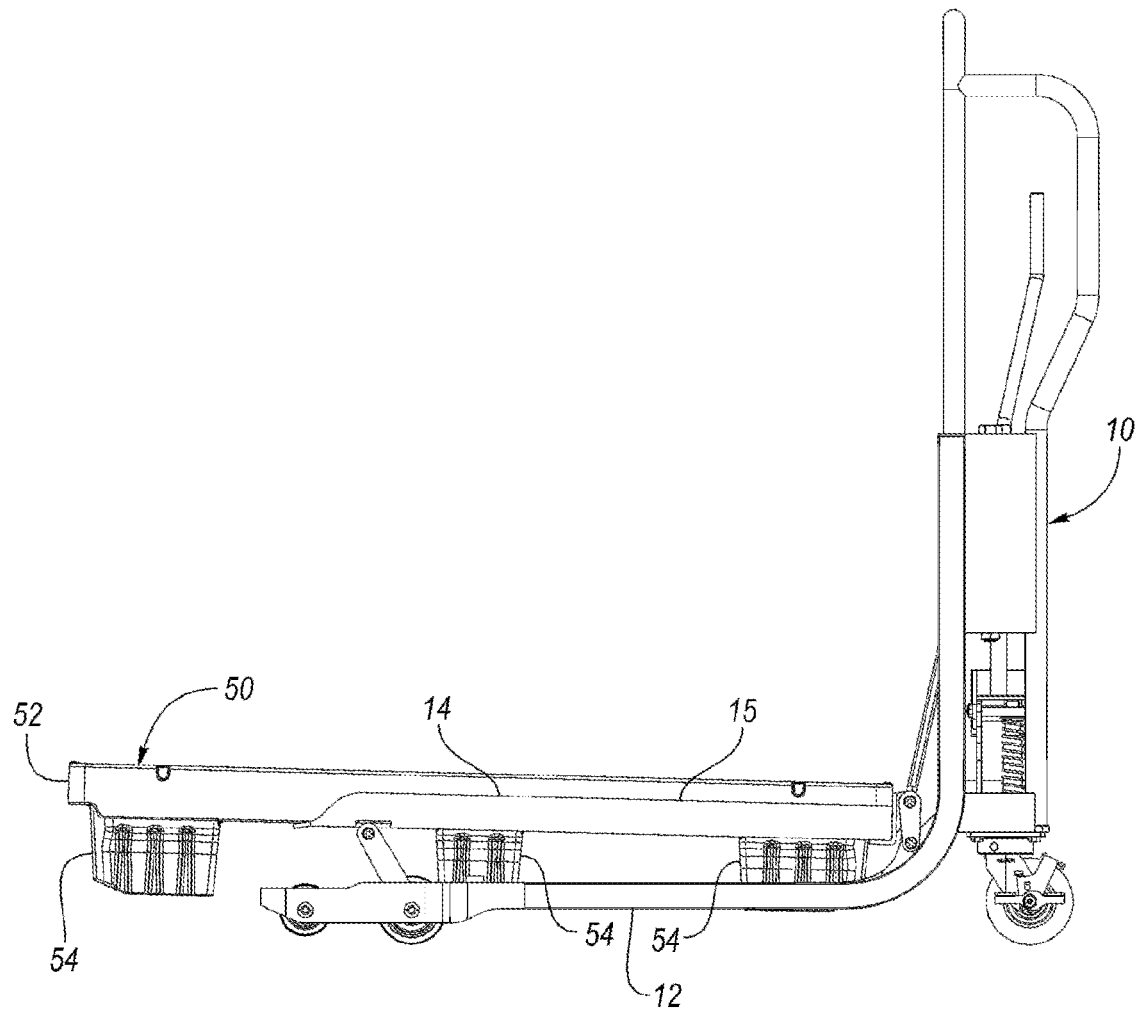

FIGS. 13-15 show the pallet sled 10 with the upper frame 14 lifted to its uppermost, lifted position. As shown, in this position, the outer ends of the upper frame 14 are higher above the floor than the inner ends of the upper frame 14 and the cradle 19. This is implemented by the relative lengths and positions of the outer pivot arms 16 and the inner pivot arms and the positions of their axes which are selected to cause the upper frame 14 to tilt rearward toward the inner end slightly (e.g. approximately 1.5 to approximately 2.0 degrees). In this position, the upper frame 14 and upper arms 15 are tilted approximately 1.5 to approximately 2.0 degrees relative to the floor and to the lower frame 12 and to the lower arms 13.

Angling the upper frame 14 and/or cradle towards the vertical handle portion 20/backrest could help with load stability by shifting the load center of mass towards the backrest. This is especially helpful when there is a sufficiently tall or imbalanced load or pallet 50. When angling the load back, the load contact with the vertical handle portion 20 (backrest) is increased also improving load stability.

Angling the upper frame 14 and/or cradle 19 towards the vertical handle portion 20 may also help prevent the possibility that the loaded pallet 50 would slide off the pallet sled 10, especially when coming to an abrupt stop. An abrupt stop could occur when hitting a pothole or tall threshold without adequate speed.

Angling the upper frame 14 also increases the frontal ground clearance of the pallet 50, particularly the lead feet 54. This is especially helpful when entering or exiting ground undulations such as ramps (ADA, sidewalk, etc.) and door thresholds. This may prevent the pallet 50 or load from bottoming out on the ramp or threshold.

Angling the upper frame 14, cradle 19 or tine back may also permit the upper frame 14 and cradle 19 to be lower overall, which could increase maneuverability. The required support under the pallet 50 or load can also be reduced in length compared to a horizontal version due to the shift in center of mass rearward. A standard horizontal tine for a 48" long pallet 50 will be about 44-48" whereas a tilted tine (the upper arms 15) could be shorter, less than or equal to approximately 38" long, or approximately 29" to approximately 38" to provide the same amount of ground clearance. Generally, it is possible for the upper frame 14 to be less than 80% of the length of the pallet only if the frame is tilted. As another example, an upper frame 14 for a 42" pallet could be approximately 33" long or less.

While the desired angle of the tilt will vary depending on pallet 50 (geometry, rigidity, etc.) and application (pallet load, load geometry, required ground clearance, etc.), the linkage geometry allows the angle to be adjusted via the lengths of pivot arms 16, 18. For example, adequate pallet support and ground clearance could be achieved with approximately 2.0 deg (+/−0.25 deg) tilt on a 48" long pallet and only approximately 1.5 deg (+/−0.25 deg) tilt on a 42" long pallet.

Figure 16:
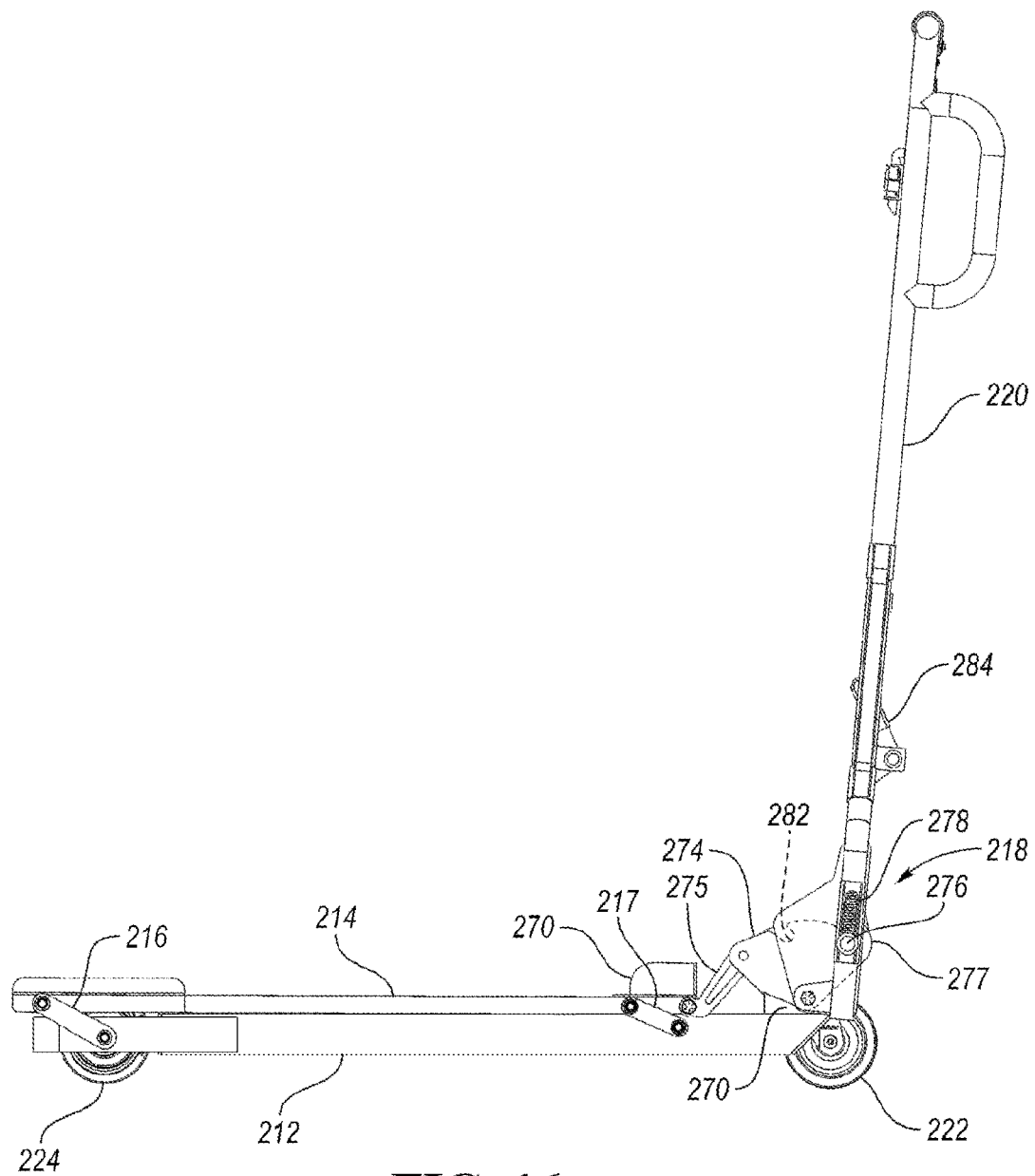
FIG. 16 is a side view of an alternate pallet sled with a manual lift mechanism in the low position.
Figure 17:
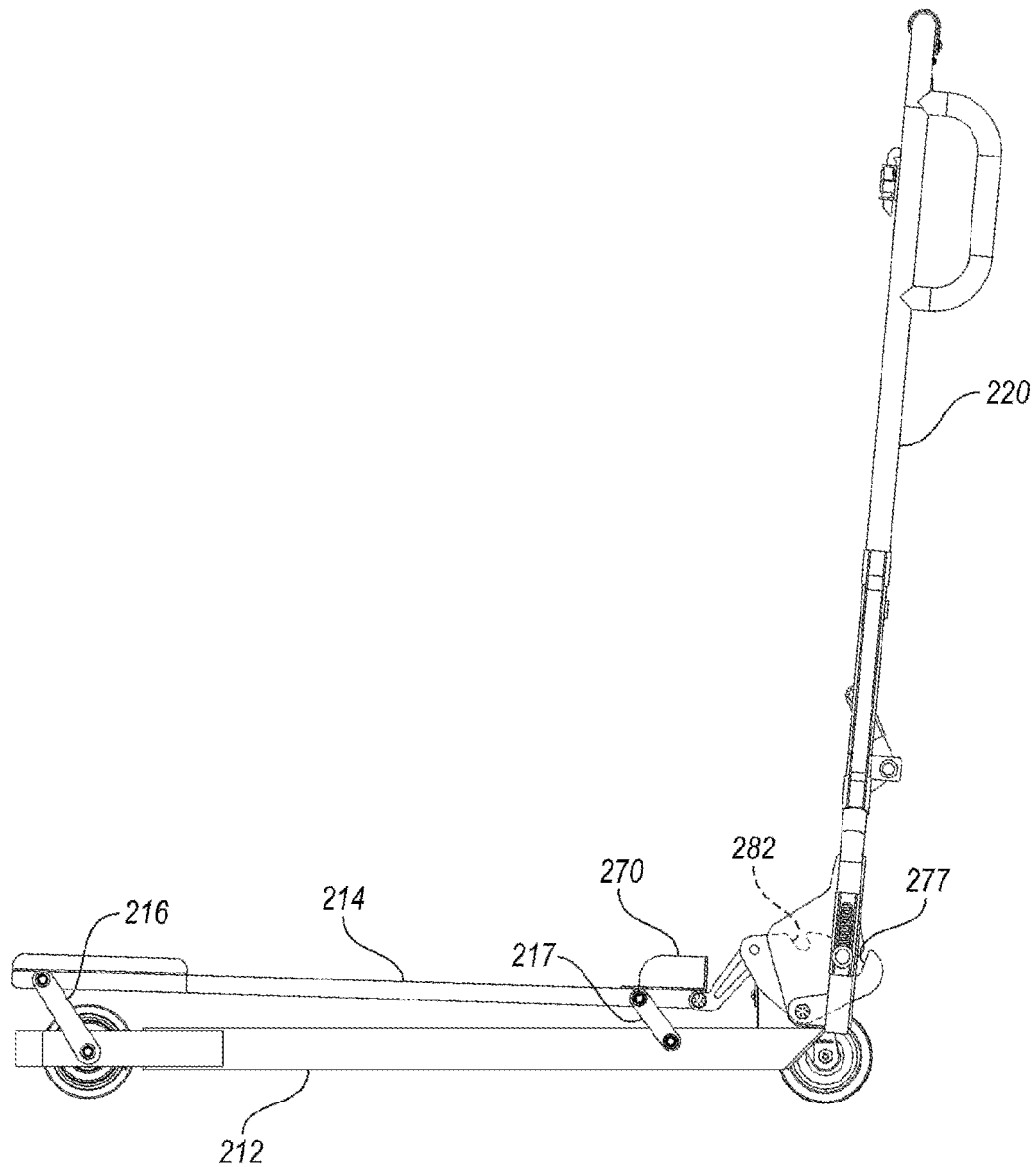
FIG. 17 shows the pallet sled of FIG. 16 in the raised position.

FIGS. 16 and 17 show an alternate pallet sled 210 with a manual lift mechanism (i.e. no hydraulics, but only mechanical leverage). The sled 210 includes a lower frame 212 and upper frame 214 connected by outer pivot arms 216 and by inner pivot arms 217. The outer pivot arms 216 are longer than the inner pivot arms 217. A handle 220 connects to the lift mechanism 218 at a forward end of the sled 210. A pair of casters 222 support the lower frame 212 at the forward end. A pair of wheels 224 support the lower frame 212 at the rearward end.

The handle 220 is pivotably connected to the base 270 and the lower frame 212. A pair of ratchet plates 274 are also pivotably connected to the base 270 about the same axis as the handle 220. The ratchet plates 274 are pivotably connected to the upper frame 214 by a pair of angled brackets 275. Each ratchet plate 274 includes a low notch 277 and a high notch 282.

An index crossbar 276 extends between vertical portions of the handle 220 and through elongated openings in each vertical portion. A spring 278 in each vertical portion of the handle 220 biases the index crossbar 276 downward. In the position shown, where the upper frame 214 is lowered, the index crossbar 276 is also received in the low notch 277 in each ratchet plate 274 and retained there by the spring 278.

A pivotable folding lever 284 is mounted to the handle 220. The lever 284 can raise the index crossbar 276 upward within the elongated openings in the handle 220, compressing the springs 278.

In FIG. 16, the handle 220 is engaged with the ratchet plates 274, with the index crossbar 276 engaging the low notches 277 of the ratchet plates 274, so that the upper frame 214 is in the lowered position, close to the lower frame 212.

To raise the upper frame 214 to the raised position, the handle 220 can be pulled forward and down (not shown). This causes the ratchet plates 274 to pivot forward, drawing the upper frame 214 forward and upward (pivoting on arms 216, 217). The upper frame 214 may pivot forward to a point where the arms 216 are past vertical, so that the upper frame 214 will remain in place even after force on the handle 220 is no longer applied.

As shown in FIG. 17, the outer pivot arms 216 are longer than the inner pivot arms 217. This causes the upper frame 214 to be angled forward toward the handle 220. Angling the upper frame 214 and/or cradle 270 towards the vertical handle portion 220/backrest could help with load stability by shifting the load center of mass towards the backrest. This is especially helpful when there is a sufficiently tall or imbalanced load or pallet. When angling the load back, the load contact with the vertical handle portion 220/backrest is increased also improving load stability.

Again, angling the upper frame 214, cradle 270 or arms back may also permit the pallet sled 210 to be shorter, which could increase maneuverability. The required support under the pallet or load can be reduced in length compared to the purely horizontal version due to the shift in center of mass rearward. A standard horizontal tine for a 48" long pallet 50 will be about 44-48" whereas a tilted tine could be shorter, less than or equal to approximately 38" long, or approximately 29" to approximately 38", to provide the same amount of ground clearance. Generally, it is possible for the upper frame 14 to be less than 80% of the length of the pallet only if the frame is tilted. As another example, an upper frame 14 for a 42" pallet could be approximately 33" long or less.

While the desired angle of the tilt will vary depending on pallet (geometry, rigidity, etc.) and application (pallet load, load geometry, required ground clearance, etc.), the linkage geometry allows the angle to be adjusted via the lengths of pivot arms 216, 217. For example, adequate pallet support and ground clearance could be achieved with about a 2.0 deg (+/−0.25 deg) tilt on a 48" long pallet and only about a 1.5 deg (+/−0.25 deg) tilt on a 42" long pallet.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A pallet sled comprising:
   a lower frame;
   an upper frame;
   a plurality of pivot arms pivotably connecting the upper frame to the lower frame, wherein the upper frame is movable between a lowered position and a raised position, wherein the upper frame is spaced further from the lower frame in the raised position than in the lowered position, and wherein the upper frame is configured to rotate slightly relative to the lower frame when moved from the lowered position to the raised position.

2. The pallet sled of claim 1 wherein the upper frame and the lower frame each include a pair of spaced-apart arms and each are open outwardly to receive feet of a pallet.

3. The pallet sled of claim 2 further including a lift mechanism for selectively moving the upper frame from the lowered position to the raised position.

4. The pallet sled of claim 3 wherein the plurality of pivot arms includes outer pivot arms connecting the pair of spaced-apart arms of the upper frame to the pair of spaced-apart arms of the lower frame.

5. The pallet sled of claim 4 wherein the plurality of pivot arms further includes inner pivot arms connecting the pair of spaced-apart arms of the upper frame to the pair of spaced-apart arms of the lower frame, wherein the inner pivot arms are inward of the outer pivot arms.

6. The pallet sled of claim 5 wherein the outer pivot arms are longer than the inner pivot arms.

7. The pallet sled of claim 6 wherein the upper frame rotates approximately 1.5 to approximately 2.0 degrees when the upper frame is moved from the lowered position to the raised position.

8. The pallet sled of claim 7 wherein the pair of spaced-apart arms of the upper frame are less than or equal to approximately 38" long.

9. The pallet sled of claim 5 wherein the outer pivot arms and the inner pivot arms are configured to tilt the upper frame relative to the lower frame when the upper frame is moved from the lowered position to the raised position.

10. The pallet sled of claim 9 further including wheels supporting the lower frame.

11. The pallet sled of claim 10 further including a base and a vertical handle at an inner end of the lower frame.

12. The pallet sled of claim 11 wherein the lift mechanism is manual, hydraulic, electric or electrohydraulic.

13. A pallet sled comprising:
    a lower frame;
    a plurality of wheels supporting the lower frame;
    an upper frame;
    wherein the upper frame is movable relative to the lower frame between a lowered position and a raised position, wherein the upper frame is spaced further from the lower frame in the raised position than in the lowered position, and wherein the upper frame is configured such that when the upper frame is in the raised position the upper frame tilts approximately 1.5 to approximately 2.0 degrees relative to a floor on which the plurality of wheels would contact.

14. The pallet sled of claim 13 further including a plurality of pivot arms pivotably connecting the upper frame to the lower frame, wherein the plurality of pivot arms are configured to cause the upper frame to be tilted approximately 1.5 to approximately 2.0 degrees relative to the floor on which the plurality of wheels would rest.

15. The pallet sled of claim 13 further including a generally vertical handle portion extending upward from the lower frame, wherein the upper frame is configured to tilt toward the generally vertical handle portion when the upper frame is in the raised position.

16. A method for lifting a pallet including the steps of:
    a) moving upper arms of a pallet sled under a deck of the pallet resting on a floor, while the upper arms are in a lowered position; and
    b) after said step a), raising the upper arms from the lowered position to a raised position to lift the pallet off the floor and rotating the upper arms relative to the floor to tilt the pallet relative to the floor.

17. The method of claim 16 wherein the pallet is tilted approximately 1.5 to approximately 2.0 degrees in said step b).

18. A pallet and a pallet sled comprising:
    the pallet sled including a lower frame, a plurality of wheels supporting the lower frame, and an upper frame, wherein the upper frame is movable relative to the lower frame between a lowered position and a raised position, wherein the upper frame is spaced further from the lower frame in the raised position than in the lowered position, wherein the upper frame is approximately 29 inches to approximately 38 inches long; and
    the pallet including a deck supported by feet, wherein the deck is supported on the upper frame of the pallet sled, wherein the deck of the pallet is approximately 48 inches long.

19. The pallet and pallet sled of claim 18 wherein the upper frame is approximately 29 inches long.

20. The pallet and pallet sled of claim 18 wherein the upper frame is approximately 38 inches long.

21. The pallet and pallet sled of claim 19 wherein the upper frame is tilted approximately 1.5 to approximately 2.0 degrees relative to a floor on which the plurality of wheels are supported when the upper frame is in the raised position.

22. The pallet and pallet sled of claim 18 wherein the upper frame is tilted approximately 1.5 to approximately 2.0 degrees relative to a floor on which the plurality of wheels are supported when the upper frame is in the raised position.

23. The pallet and pallet sled of claim 18 wherein the pallet sled further includes a pair of outer pivot arms and a pair of inner pivot arms connecting the upper frame to the lower frame, wherein the outer pivot arms are longer than the inner pivot arms.

24. The method of claim 13 wherein the plurality of pivot arms includes outer pivot arms and inner pivot arms and wherein the outer pivot arms are longer than the inner pivot arms to rotate the upper frame relative to the floor.

25. The method of claim 14 wherein the plurality of pivot arms includes outer pivot arms and inner pivot arms and wherein the outer pivot arms are longer than the inner pivot arms to rotate the upper frame relative to the floor.

26. The method of claim 16 wherein the upper arms are pivotably connected to outer pivot arms and inner pivot arms, wherein the outer pivot arms are longer than the inner pivot arms to rotate the upper arms relative to the floor.

* * * * *

UNITED STATES PATENT AND TRADEMARK OFFICE
CERTIFICATE OF CORRECTION

PATENT NO. : 11,034,371 B2
APPLICATION NO. : 16/933681
DATED : June 15, 2021
INVENTOR(S) : Kalinowski et al.

Page 1 of 1

It is certified that error appears in the above-identified patent and that said Letters Patent is hereby corrected as shown below:

In the Claims

In Claim 24, Column 6, Line 60; replace "method" with --pallet sled--

In Claim 24, Column 6, Line 60-61; replace "wherein the plurality of pivot arms includes" with --further including a plurality of pivot arms including--

In Claim 25, Column 6, Line 64; replace "method" with --pallet sled--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*